United States Patent [19]

Johnston et al.

[11] 4,284,217

[45] Aug. 18, 1981

[54] BALL CARRIER

[76] Inventors: James J. Johnston, 14 Anchorage La., Old Saybrook, Conn. 06475; Robert W. Clarke, 15 Wilcox St., Wethersfield, Conn. 06109

[21] Appl. No.: 114,116

[22] Filed: Jan. 21, 1980

[51] Int. Cl.³ .............................................. B62J 11/00
[52] U.S. Cl. .................................. 224/30 R; 224/255; 224/919
[58] Field of Search ................ 224/45 L, 30 R, 30 A, 224/41, 36, 255, 919; 211/14; 248/216.1, 217.3, 309 A; 273/58 B, 58 BA, 65 C, 65 D, 65 EG, 58 C; 294/19 A

[56] References Cited

U.S. PATENT DOCUMENTS

| 1,543,743 | 6/1925 | Ballard | 224/45 L |
| 3,220,729 | 11/1965 | Whittington | 273/58 C |
| 3,315,933 | 4/1967 | Tatham | 248/309 A |
| 3,719,342 | 3/1973 | Kupersmit | 248/216.1 |
| 4,192,044 | 3/1980 | Ballerini | 273/58 C |

FOREIGN PATENT DOCUMENTS

| 600560 | 10/1926 | France | 224/41 |
| 514211 | 2/1955 | Italy | 224/30 A |

*Primary Examiner*—Stephen Marcus
*Attorney, Agent, or Firm*—McCormick, Paulding & Huber

[57] ABSTRACT

An inflatable ball is carried on a bicycle by a carrying device which has a holder releasably engaging the bicycle handlebar and a stem projecting from the holder into the valve of the ball and grippingly engaging a wall of the valve within the interior of the ball.

17 Claims, 4 Drawing Figures

BALL CARRIER

BACKGROUND OF THE INVENTION

This invention relates in general to ball carriers and deals more particularly with an improved device for carrying a large ball of inflatable type, such as a basketball, volleyball or football. Such a ball is quite cumbersome to transport, since it cannot be conveniently carried in one hand. A problem may be encountered in carrying such a ball while riding a bicycle or motor bike, since the basket and rack-type carriers usually provided on bicycles and motor bikes are not particularly suitable to accommodate large balls. Consequently, a rider will frequently be required to cradle a ball in one arm while steering with the other arm. Such practice is potentially dangerous and is likely to result in serious accident. Bag or net type ball carriers have been heretofore available, however, such ball carriers have not gained general acceptance. The present invention is generally concerned with the problem of providing an improved carrier for such a large inflatable ball. A more specific aim of the invention is to provide an improved ball carrier particularly suitable for transporting such a ball on a bicycle, motor bike or the like.

SUMMARY OF THE INVENTION

In accordance with the invention, an improved carrier for an inflatable ball comprises a holder, an elongated stem which projects from the holder for insertion into the valve of a ball, and means on the stem for grippingly engaging a wall of the valve.

DETAILED DESCRIPTION PREFERRED EMBODIMENT

Figure 1:
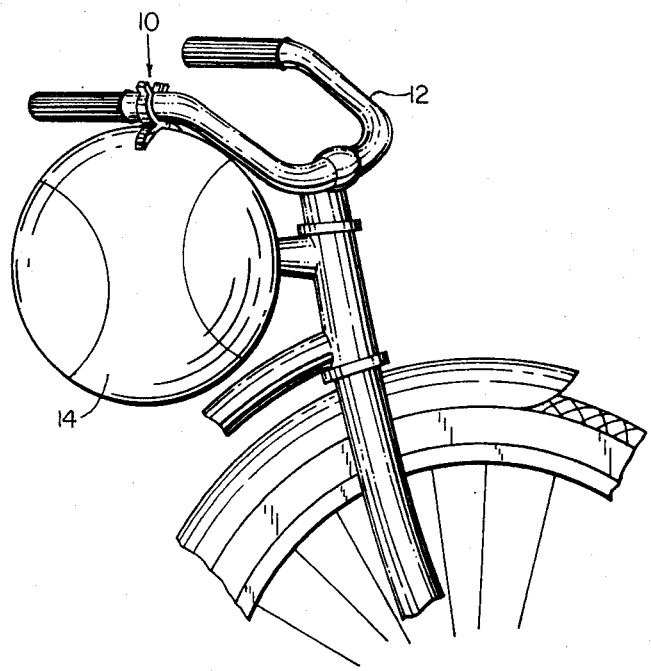
FIG. 1 is a fragmentary perspective view and shows an inflatable ball suspended from the handlebar of a bicycle by a ball carrier embodying the invention.

In the drawing and in the description which follows the invention is illustrated and described with reference to a ball carrier particularly adapted for mounting on the handlebar of a bicycle or motor bike. Referring now to the drawing, a ball carrier embodying the present invention and indicated generally by the reference numeral 10 is shown in FIG. 1 mounted on a bicycle handlebar 12 and supporting an inflatable ball 14. The ball carrier 10 generally comprises a holder 16 and a stem 18 which projects axially from the holder and which is received within the valve of the ball. Means on the stem grippingly engages a wall of the valve to support the ball 14 in a depending position relative to the bicycle handlebar 12, as will be hereinafter more fully discussed.

The ball 14 which may, for example, comprise a basketball and has a conventional valve 20 which has a body wholly disposed within the ball 14 and which terminates at the outer peripheral surface of the ball. The illustrated valve 20 is made from relatively soft elastomeric material such as rubber is adhered to the inner surface of the ball. A blind cylindrical bore formed in the valve body opens through the peripheral surface of the ball and extends for some distance into the ball. The bore has a diametrically enlarged outer end portion 22 and an inner end portion 24 which terminates at an inner end wall 26. The inner end wall is divided into two half sections by a diametrically extending slit. The valve 20 is adapted to receive a conventional needle valve which is used to inflate the ball. The slit is normally held in tightly closed position by air pressure within the ball exerted upon the inner end portion of the valve. However, the needle valve for inflating the ball may be inserted into the bore and through the slit. When the needle valve is withdrawn from the valve the slit closes preventing escape of air from the ball.

Considering now the ball carrier 10 in further detail, it is preferably made from a durable highly resilient plastic material and is of a unitary construction. The holder portion of the carrier may take various forms and may, for example, be formed as a handle to be manually grasped in carrying the ball or as a hook which may be used to hang the ball on a suitable support member for storage. In the illustrated embodiment, however, the holder portion, identified generally by the numeral 16, is particularly adapted for releasable connection to a bicycle handlebar such as the handlebar 12. The holder portion 16 has a generally C-shaped configuration and includes a parti-cylindrical inner surface 25 adapted to generally complement and frictionally engage an associated portion of a bicycle handlebar. Radially outwardly extending tabs 26, 26 at the upper end of the holder portion define an opening therebetween to facilitate snap-on connection of the holder to a handlebar. Outwardly diverging guide surfaces 28, 28 defined by the latter tabs aid in engaging the holder with the handlebar.

The retaining stem is integrally connected at one end to the holder 16 and projects outwardly from it opposite the opening in the holder. The stem 18 is generally cylindrical, has a smooth rounded free end portion and an overall length which is preferably greater than the axial length of the outer end portion 22 but less than the overall length of the valve bore. The stem has at least one integral diametrically enlarged protrusion spaced from its free end for gripping engagement with the valve within the bore. Preferably, and as shown, the illustrated carrier 10 has three protrusions or radially enlarged annular flanges on its stem. The enlarged flanges, designated at 30, 30 are axially spaced apart and have a generally saw-tooth configuration as viewed in an axial plane. The illustrated flanges are of substantially equal diameter and terminate at relatively sharp annular outer edges. The outside diameter of each flange is substantially greater than the inside diameter of the bore outer end portion 22. Preferably the outside diameter of each flange is approximate twice the inside diameter of the outer end portion 22.

A stabilizing member 32 integrally formed on the carrier 10 at the junction of the holder and the stem extend generally radially outwardly in opposite directions beyond the stem 18. The stabilizing portions cooperate to define an arcuate surface 34 facing in the direction of the free end and having a radius of curvature located generally along the axis of the stem 18. Preferably, the radius of curvature of the surface 34 is approximately equal to the radius of the largest ball which the carrier is adapted to accommodate.

Figure 2:
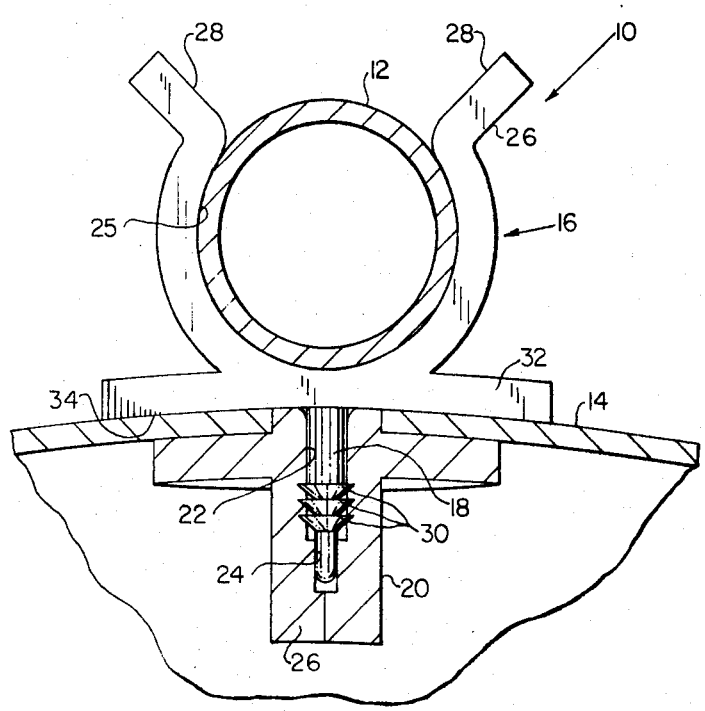
FIG. 2 is a somewhat enlarged fragmentary side elevational view of the ball carrier of FIG. 1 shown in connected relation with the valve of a ball, the ball and its valve being shown in section.
Figure 3:
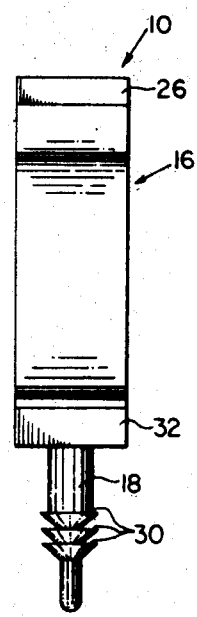
FIG. 3 is a side elevational view of the ball carrier.

Preparatory to carrying the ball 14, the stem 18 is forceably inserted into the valve 20. The radially enlarged flanges 30, 30 grippingly engage the inner wall of the valve bore within the outer end portion 22 and effect some degree of deformation of the bore wall. When the stem 18 is fully inserted into the valve bore the free end portion is preferably disposed within the inner end portion 24, substantially as shown in FIG. 2. Air under pressure entrapped within the ball exerts pressure on the outer surface of the valve body to resist radial expansion of the body and thereby increase the grip of the soft elastomeric valve body upon the stem and its enlarged retaining flanges 30, 30. When the stem 18 is fully inserted into the valve, the stabilizing member 32 engages the peripheral surface of the ball 14. The holder 16 may then be snapped into position on the bicycle handlebar 12. A holder is preferably dimensioned for relatively tight gripping engagement with the bicycle handlebar. The parti-cylindrical inner surface 25 tends to maintain the holder 16 in a relatively fixed position on the handlebar so that is resists swaying movement relative to the handlebar. The stabilizing member 32 cooperates with the stem 18 to retain the ball 14 in a substantially fixed position relative to the holder so that the ball will not sway or move laterally due to motion of the bicycle.

Figure 4:
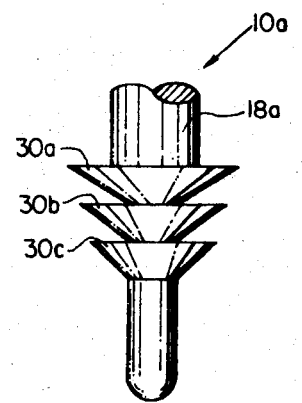
FIG. 4 is a fragmentary side elevation of the stem portion of another ball carrier and illustrates another embodiment of the invention.

In FIG. 4 there is shown another ball carrier embodying the invention and indicated generally by the reference numeral 10a. The ball carrier 10a is similar in most respects to the carrier 10 previously described but differs therefrom in the construction and arrangement of its ball retaining stem 18a, which is illustrated. The stem 18a is formed with a plurality of radially enlarged and axially spaced apart annular flanges, indicated at 30a, 30b, and 30c. The latter flanges have a saw-tooth configuration, as viewed in an axial plane and decrease progressively in diameter toward the free end of the stem. The diameter of each flange is somewhat greater than the diameter of the outer end portion of a valve bore into which it is adapted to be received. The ball retaining stem 18a is easily inserted into the valve of an associated ball, but will deform the soft elastomeric valve material sufficiently to assure a tight grip on the ball.

As previously noted, the device has been illustrated and described with reference to bicycle accessories, however, it should be understood that ball carriers of other types are contemplated within the scope of the invention. The term holder as it is heretofore used, is not to be construed as being restricted to a handlebar clip for a bicycle, since holders of other types are contemplated within the scope of invention.

We claim:

1. A carrier for an inflatable ball having a valve disposed within the interior of the ball, the valve including a blind generally cylindrical bore opening outwardly through the peripheral surface of the ball, said carrier comprising resilient clip means for snap-on connection to the handlebar of a bicycle, and ball retaining means mounted on said clip means for gripping the valve within the bore to releasably retain the ball in connected relation to said clip means.

2. A ball carrier as set forth in claim 1 wherein said ball retaining means comprises an axially elongated stem for insertion in the bore and at least one protrusion on said stem for grippingly engaging the wall of the bore.

3. A ball carrier as set forth in claim 2 wherein said one protrusion comprises an annular flange on said stem.

4. A ball carrier as set forth in claim 3 wherein said ball retaining means comprises a plurality of axially spaced annular flanges on said stem.

5. A ball carrier as set forth in claim 4 wherein said stem is connected at one end to said ball retaining means and has a free end and said annular flanges decrease in diameter progressively toward said free end.

6. A ball carrier as set forth in either claim 4 or claim 5 wherein each of said annular flanges has a generally saw-tooth cross sectional configuration as viewed in axial section.

7. A ball carrier as set forth in any one of claims 2 through 4 further characterized in that the bore has an inner end portion and a diametrically enlarged outer end portion and the stem includes a free end portion which has a diameter at least equal to the diameter of the inner end portion of the bore.

8. A ball carrier as set forth in any one of claims 3 through 5 further characterized in that the bore has a diametrically enlarged outer end portion and each flange engages the bore within said outer end portion.

9. A ball carrier as set forth in any one of claims 1 through 5 wherein said clip is further characterized as a generally C-shaped clip having a parti-cylindrical inner surface for engaging a generally cylindrical portion of the handlebar.

10. A ball carrier as set forth in any one of claims 1 through 5 wherein said carrier includes ball stabilizing means disposed between said resilient clip means and said ball retaining means for engaging the peripheral surface of a ball when the ball is secured in connected relation to said holder means by said ball retaining means.

11. A carrier for releasably retaining an inflatable ball on a bicycle or the like having a handlebar, the ball having a valve disposed therein and terminating at the outer peripheral surface of the ball, the valve having a generally cylindrical stepped bore opening through the peripheral surface of the ball including a diametrically enlarged outer end portion and an inner end portion terminating at an inner end wall of the valve, said ball carrier comprising a unitary member made from resilient material and including a holder and a ball retaining stem, said holder having a generally C-shaped configuration and defining an opening for snap-on engagement with an associated portion of the handlebar and a parti-cylindrical inner surface for engaging the handlebar, said ball retaining stem being integrally connected to said holder and projecting axially outwardly from said holder and including a free end portion adapted to be received in the inner end portion of the valve bore, said free end portion having a diameter at least equal to the diameter of said inner end portion, said stem having at least one radially enlarged annular flange thereon between said free end portion and said holder, said one annular flange having an outside diameter larger than the diameter of the outer end portion of the valve bore.

12. A ball carrier as set forth in claim 11 wherein said free end portion has a diameter larger than the diameter of the inner end portion.

13. A ball carrier as set forth in claim 11 including ball stabilizing means disposed between said stem and said holder for engaging an associated part of a ball releasably secured to said holder by said ball retaining stem.

14. A ball carrier as set forth in claim 13 wherein said ball stabilizing means comprises an integral part of said carrier disposed generally at the junction of said stem and said holder and having an arcuate surface facing in the direction of said free end portion and curving generally toward said free end portion.

15. A carrier for an inflatable ball having a valve disposed within the interior of the ball, the valve including a blind generally cylindrical bore opening outwardly through the peripheral surface of the ball, said carrier comprising holder means for carrying the ball, ball retaining means mounted on said carrier for gripping the valve within the bore to releasably retain the ball in connected relation to the holder means, and ball stabilizing means disposed between said holder means and said ball retaining means for engaging the peripheral surface of a ball when the ball is secured in connected relation to said holder means by said ball retaining means.

16. A carrier for an inflatable ball as set forth in claim 15 wherein said retaining means comprises an axially elongated stem projecting from said holder and said stabilizing means comprises stabilizing portions of said carrier extending radially outwardly in opposite directions from said stem and having arcuate surfaces facing generally in the direction of the free end of said stem.

17. A carrier for an inflatable ball as set forth in claim 16 wherein said arcuate surfaces have a center of curvature located along the axis of said stem.

* * * * *